United States Patent [19]
Muller

[11] 3,771,778
[45] Nov. 13, 1973

[54] PRESSURIZED RUBBER FOR ABSORBING IMPACT ENERGY

[76] Inventor: John George Muller, 7817 Calpurnia Ct., McLean, Va.

[22] Filed: Feb. 1, 1971

[21] Appl. No.: 111,534

[52] U.S. Cl. ............................................. 267/140
[51] Int. Cl. ............................................. F16g 5/00
[58] Field of Search ............................. 267/140, 63

[56] References Cited
UNITED STATES PATENTS 3,514,144   5/1970   Alderger ......................... 267/140

*Primary Examiner*—James B. Marbert
*Attorney*—William A. Drucker, Esq.

[57] ABSTRACT

The present invention is a method for more fully utilizing a mass of rubber or other elastomer to cushion and absorb the energy of impact when one rigid body strikes another. The method involves provision of at least one liquid filled leakproof interior cavity traversing substantially all of the rubber mass. The crushing effect of the impact pressurizes the liquid thereby causing the rubber to be stressed, and deformed and energy to be absorbed.

2 Claims, 14 Drawing Figures

PATENTED NOV 13 1973 3,771,778

PRESSURIZED RUBBER FOR ABSORBING IMPACT ENERGY

BACKGROUND OF THE INVENTION

Field of the Invention

This invention relates to an improved design for bumpers, fenders and other cushioning devices made of rubber or other elastomers.

When it is desired to minimize impact damage and shock due to a suddenly applied load, rubber is often used. Rubber and similar elastomers absorb more energy ( in ft. — lbs. per pound) than other materials.

S. Timoshenko in his book, *Strength of Materials*, Part I, "Elementary Theory and Problems," 3rd Edition, p 303 presents the following data for the strain energy which can be stored by various materials without permanent set:

| Material | Energy Stored in Inch Pounds per Pound |
|---|---|
| Structural steel | 53 |
| Tool steel | 850 |
| Copper | 1.6 |
| Oak | 146 |
| Rubber | 8,900 |

In absorbing energy of an impact, only that portion of the rubber which is struck undergoes deformation and absorbs energy. Portions of the rubber mass not in line with or near the direction of applied force are not deformed and from the energy absorption viewpoint are useless.

It is the object of this invention to provide an improved method for utilizing rubber for energy absorption so that when impact occurs, the entire mass of the rubber is distorted and thereby absorbs energy.

The concept has immediate application in the design of bumpers for automobiles, trucks and other vehicles.

In addition to automotive bumpers, there are many other applications for this improved method of utilizing the energy absorbing properties of rubber. Among these applications are:

Crash barriers for installation along the side of high speed highways;

Fenders attached to the bow or side of a ship, tug boat or other vessel to minimize damage in the event of a collision;

Dock fenders attached to a dock or pier to minimize damage in berthing a ship;

A portable fender hung between two vessels at a pier or dock or between a vessel and the dock to absorb loads caused by movement of the vessel(s) due to wind, wave, or current;

Ship's armour protection, particularly underwater armour against torpedo attack;

Personal body armour for soldiers and law enforcement officers to absorb energy of a bullet or shrapnel;

Fenders attached to truck loading docks;

Soldiers' helmets.

In all these applications regardless of the location of the impact and the size of the impact area, it is desirable that the full mass of rubber will be deformed, thereby absorbing most effectively the energy of the impact.

DESCRIPTION OF THE PRIOR ART

Liquid filled bumpers are known in the prior art. For example, U.S. Pat. No. 3,284,122 describes an automobile bumper where in the event of collision the liquid is forced out of small openings at a controlled rate. The kinetic energy of impact of the automobile is dissipated as hydraulic friction, acceleration and velocity head of the liquid.

U.S. Pat. No. 3,494,607 describes a fluid cushion automobile bumper wherein energy is absorbed by a combination of (a) fluid flow in an elastomeric foam, (b) expansion of a diaphragm, and (c) compression of the foam.

These designs are bulky, heavy and expensive.

SUMMARY

The present invention is a method for more fully utilizing a mass of rubber or other elastomer to cushion and absorb the energy of impact when one rigid body strikes another. The method involves provision of at least one liquid filled leakproof interior cavity traversing substantially all of the rubber mass. The crushing effect of the impact pressuizes the liquid thereby causing the rubber to be stressed, and deformed and energy to be absorbed.

In the present invention energy is absorbed in stretching of a rubber pressure vessel exposed to internal pressure or compressing a vessel subjected to external liquid pressure. While liquid is used to pressurize the vessel, hydraulic friction is not relied upon for energy absorption. In this important respect it differs from the prior art cited above.

The present invention results in more effective, more compact, less costly designs for impact energy absorption. Repeated impacts can be absorbed without damage to the rubber vessel so long as the magnitude of the impacts is not excessive for the particular design.

FIRST EMBODIMENT VESSEL SUBJECTED TO INTERNAL PRESSURE

Figure 1:
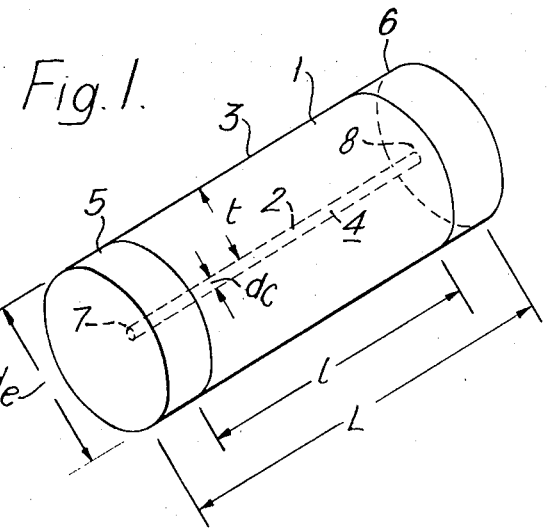
FIG. 1 is a simplified isometric view of the first embodiment of basic concept.

If an elastomer or other material is to be used efficiently to absorb impact energy associated with the collision of two rigid bodies it is desirable that all of the material mass be stressed and no substantial portion be left inactive. The desired result can be achieved by constructing the rubber mass as a thickwalled cylindrical pressure vessel. The basic concept in its simplest form is depicted in FIG. 1. The rubber pressure vessel 1 is positioned so that it will be between the impacting bodies when collision occurs. The impacting force F is assumed to have a radial direction. Although the rubber pressure vessel 1 must be attached in an appropriate manner to one of the rigid bodies, attachment means have been omitted from FIG. 1 in the interest of clarity.

The cylindrical cavity or core 2 at the center of the rubber cylinder 3 is filled with a nonfreezing liquid or jel 4 under atmospheric pressure.

The diameter of the core $d_c$ is very small relative to the outside diameter of the vessel $d_e$. The ratio of the two diameters is on the order of 1:10 the exact value being dependent upon the elastomer chosen and the severity of impact to be provided for. The heads of the vessel 5 and 6 are preferably molded integral with the cylindrical portion. The interior and exterior walls of the heads are preferably spherical in shape but may also be flat as shown in FIG. 1. or they may be elliptical or have other shapes.

Impact anywhere on the outside of the cylinder, for example, at area 7, will result in compression of the liquid 3 and a squeezing out of the liquid 4 from that portion of the cavity 2 in line with the imposed force F. A pressure wave is created followed immediately by movement of the displaced liquids under pressure toward the heads of the vessel 5 and 6. The liquid under pressure presses outward against the cylindrical cavity 3 wall and against the ends of the cavity 9,10.

The cavity diameter $d_c$ is increased as is the outer diameter of the vessel $d_e$. The wall thickness $t$ becomes less; the length of vessel L is increased. This stretching of the rubber under the pressure loading represents work done on the material. The energy thus absorbed will not then be available to deform either of the rigid bodies involved in the collision.

It will be noted that essentially none of the energy of the impact is absorbed in acceleration of the liquid, or flow friction.

Although in these pages one liquid filled cavity is shown, it may actually be advisable to provide several cavities in a vessel to insure that the entire mass of rubber will be utilizied fully with respect to energy absorption.

Also, the vessel need not have a circular cross section but can be any other shape.

Specific examples will make the basic principle more clear.

Consider a collision of an automobile having a conventional steel bumper with a telephone pole. If impact occurs near the right end of the bumper that end may be greatly deformed and thus absorb energy. Perhaps the middle of the bumper may bend somewhat and thus absorb a little energy. The left half of the bumper will be virtually intact and absorb no energy at all.

Figure 2:
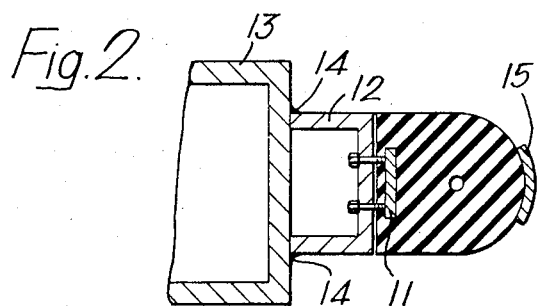
FIG. 2 is side view of an automobile fender based upon the first embodiment of this invention — Drawing shows conditions before collision occurs.
Figure 3:
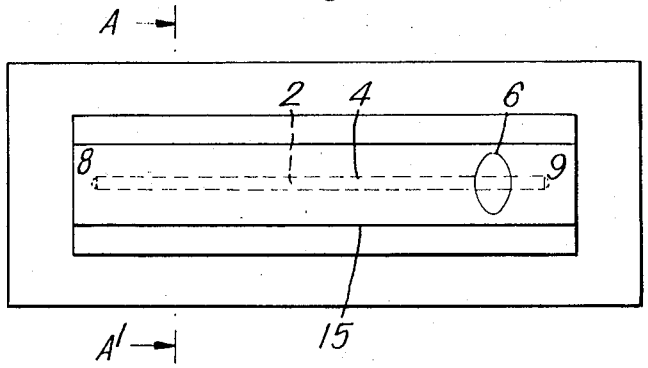
FIG. 3 is a corresponding front elevation of the same bumper.

The present invention provides a method whereby the entire bumper will participate in absorbing the energy of impact, not just the portion suffering the direct impact. This is achieved by fabricating the bumper as a leak-proof pressure vessel filled with liquid 4 as depicted in FIG. 2. (Side Elevation) and FIG. 3 (Front View.)

The rubber vessel is supported by an integral rigid structural bar 11, which is in turn affixed to a bracket 12 by bolts which in turn is affixed to the chassis of the vehicle 13 by weld of joints 14.

Figure 4:
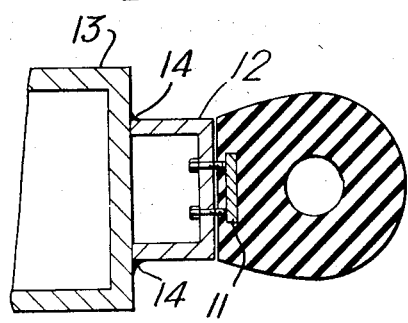
FIG. 4 is a side view of the same bumper immediately after collision.

An impact at any point along the length of the bumper such as at area 7 will result in local crushing and collapse of the cavity and a pressurization of the liquid throughout the intact portions of the cavity from 6 to 8 and from 6 to 9. This in turn will thus stretch the entire cylindrical wall 3 and ends 5 and 6 of the bumper and all of the rubber will participate in energy absorption. Another side elevation is included as FIG. 4 to illustrate enlargement of the cavity immediately after impact. To minimize likelihood of tearing the rubber vessel wall a strip of steel or other tough material may be affixed to the leading face 15 of the pressure vessel 1.

Other examples of this first embodiment of the invention can be given.

Figure 5:
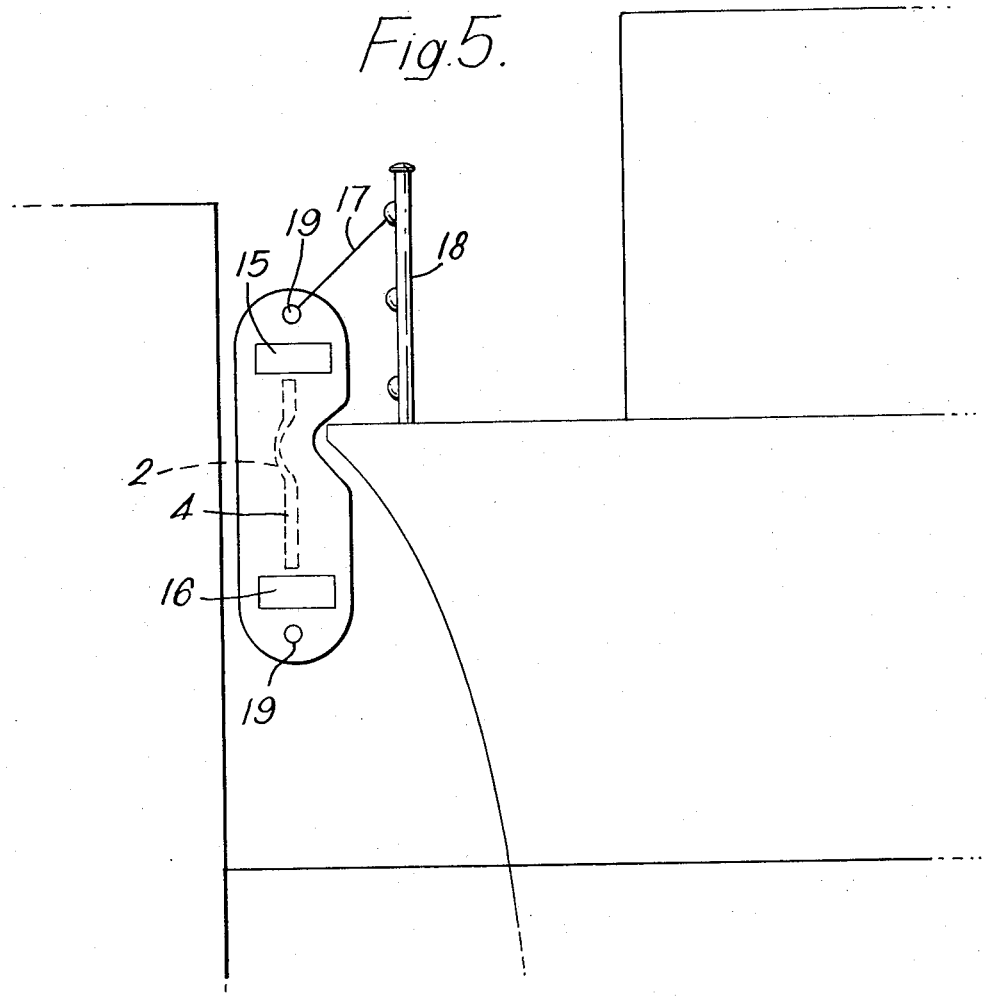
FIG. 5 is a side elevation of a portable boat fender based upon the first embodiment of this invention.

FIG. 5 depicts a portable fender for use in protecting a boat against damage due to repeated impact against a dock or pier or camel or another vessel moored alongside. The fender consists of an elongated rubber pressure vessel 1 having a liquid filled cavity 2. Air filled cavities 15 and 16 are also provided to make the fender buoyant so that it can be more easily retrieved in the event it is accidently dropped into the water. The fender is interposed between boat and dock and used in vertical orientation. It is hung over the side, bow, or stern, of the boat or from the pier by the line or rope 17. One end of the line is secured to the boat's structure such as a liferail stanchion 18. The other is tied to the fender at the eye 19.

When any portion of the pressure vessel such as 6 is compressed as a consequence of movement of the boat toward the dock, the liquid 4 in the cavity 2 is pressurized and the entire mass of rubber absorbs the energy of the impact.

Figure 6:
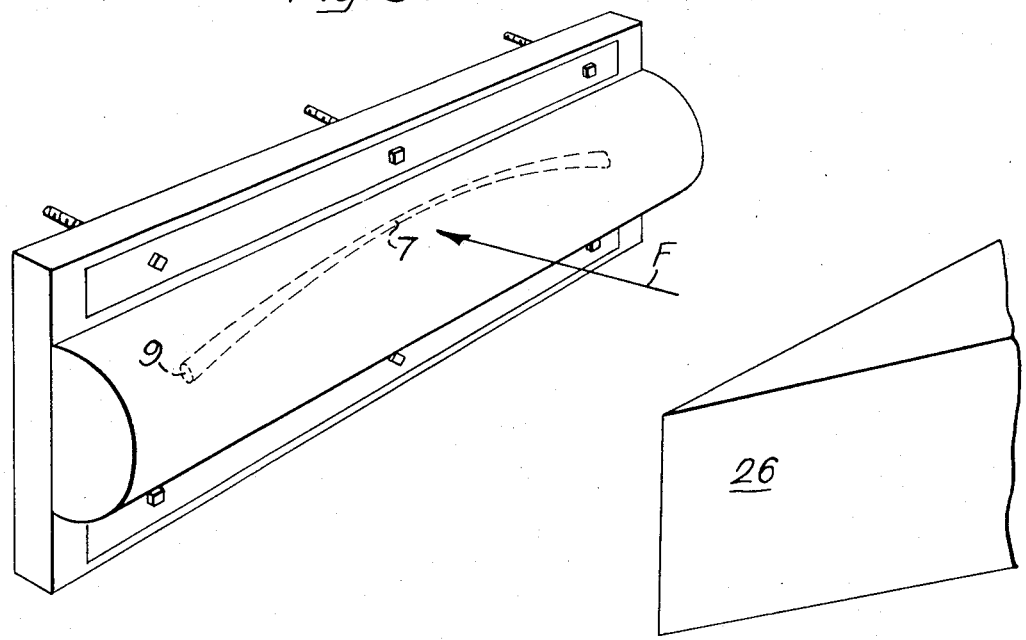
FIG. 6 is an isometric sketch of a fender for truck unloading dock based upon the first embodiment of this invention.

This first embodiment of the invention may be adapted as a fender on truck loading docks to cushion repeated "back-up" shock protecting the dock structure and the truck body. A view of one design is depicted in Isometric Drawing FIG. 6. The rubber pressure vessel 1, perhaps 6 feet long with its interior liquid filled cavity 4, is mounted horizontally on a dock wall 20. It is secured by long bolts 21 passing through holes in the rubber flange 23 and also in retaining flat bars 24 and 25. The rear corner of truck body 26, striking the vessel fender 1 at any point along its length will cause the entire length of the vessel to be pressurized. Again, all of the vessel mass is stretched and made to absorb energy of the impact.

For any material, the area under a stress-strain curve represents the work done on unit volume of material by the stress. It is thus a measure of the material's ability to absorb energy. For a bumper subjected to repeated impacts a preferred material is one having a stress-strain curve wherein the area under it from zero stress to the elastic limit is a maximum. When the material is called upon to absorb an impact load only once, the ideal material is the one where the area under the stress-strain curve from zero stress to the point of rupture is a maximum.

Because of the large deformability of rubbers their stress-strain curves enclose greater areas than that of rigid materials such as steel, cast iron, or aluminum.

Figure 7:
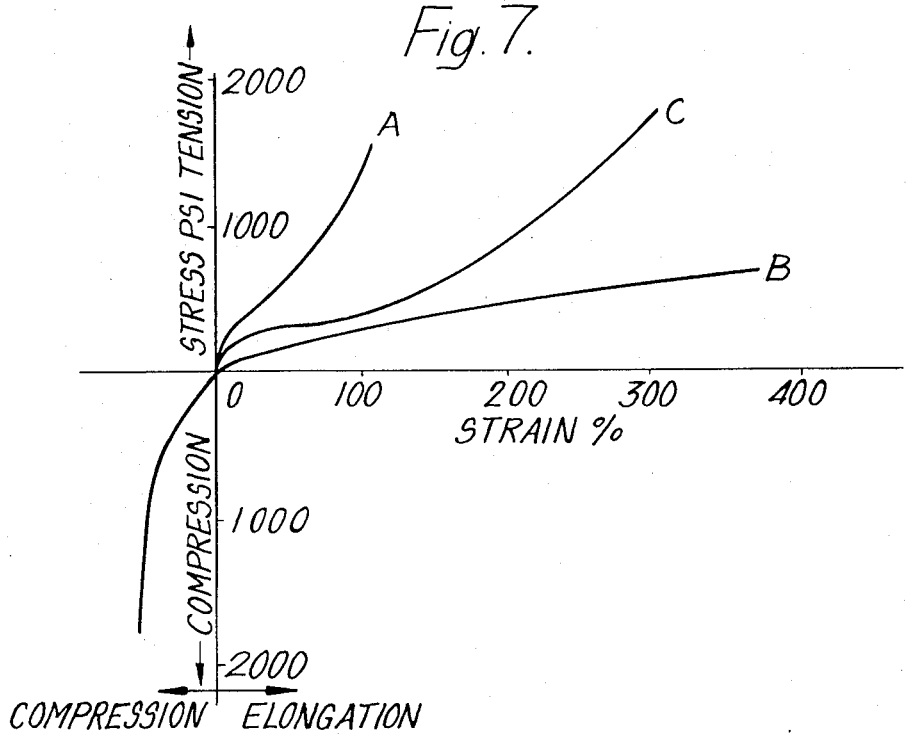
FIG. 7 shows stress-strain curves for a number of elastomers in tension and compression.

There are a great many rubber formulations. Each has its own distinctive plot of stress v. strain. A few such curves are depicted in FIG. 7.

Very hard rubbers (A in FIG. 2) deform little as compared with other elastomers. While the slope is steep, the area under the curve is then relatively small. Soft rubber (curve B in FIG. 7) deforms readily, however the stress at the elastic limit and at rupture is relatively modest. The energy absorption in that case is also disappointing. Moreover, the large amount of stretching occurring before rupture is undesirable in another respect. The volume of the cavity grows so large under the influence of hydraulic pressure that the available supply of pressuring liquid may be insufficient. Between the two extremes-very hard rubber on one hand, and very soft rubber on the other—lies the preferred rubbers (curve C of FIG. 7).

SECOND EMBODIMENT SUPPLEMENTARY RESERVOIR

As exlained above, the energy absorbing capacity of the first embodiment of the invention is limited by the amount of cavity liquid squeezed out by deformation of that part of the cavity which is in line with the force of the impact. In the second embodiment this limitation is removed. An abundant supply of liquid is made available by means of a reservoir.

Figure 8:
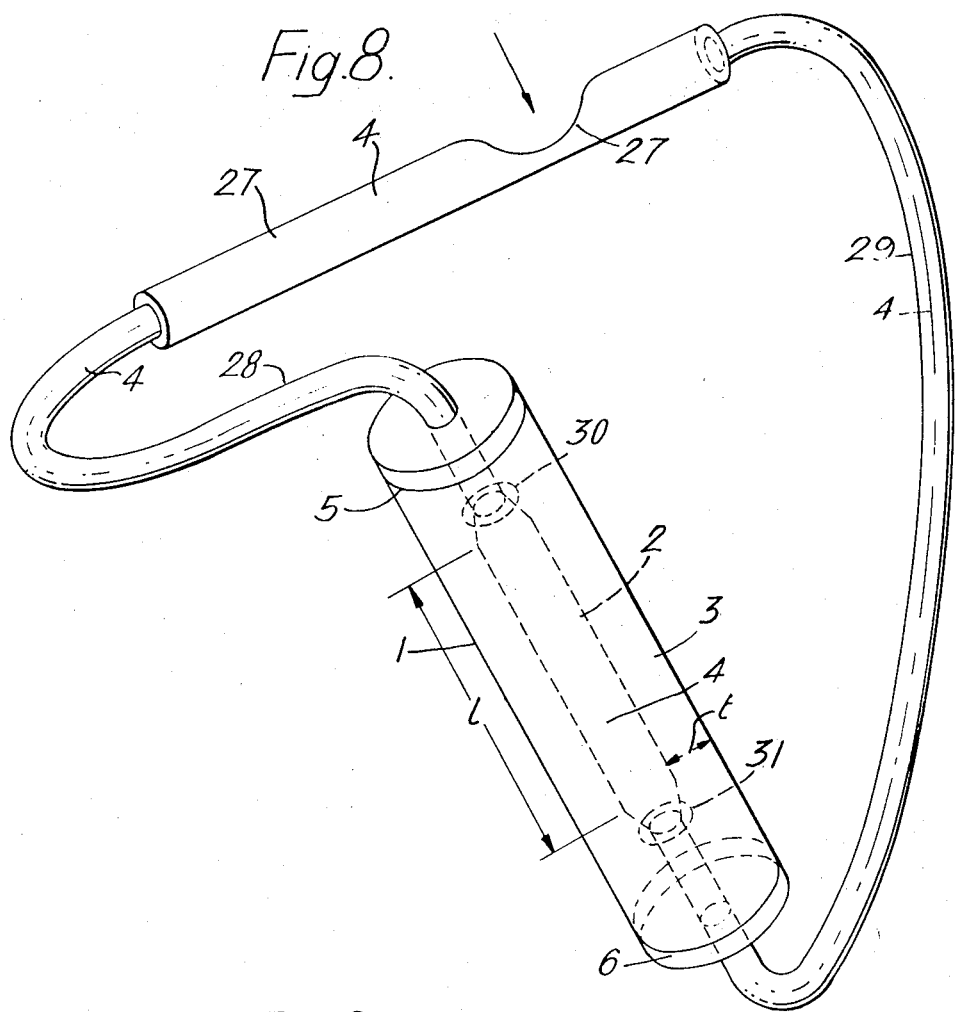
FIG. 8 is a simplified isometric view of the second embodiment of the invention showing a pressurization reservoir.

Refer now to FIG. 8. To insure an adequate supply of pressurizing liquid 4, a pressurizing reservoir is provided and affixed by means of appropriate fasteners to one of the rigid bodies which is to be protected. In the interest of simplicity neither the rigid body nor fasteners are shown in FIG. 8. It is to be emphasized that in this embodiment of the invention the rubber vessel 1 itself does not suffer impact. Only the reservoir 27 is imposed between the two colliding bodies and only the reservoir 27 suffers impact. The reservoir 27 is shown as a circular cylinder and this design is preferred. It could also be in the shape of a sphere or in the form of a cylinder having an elliptical or other cross section.

The reservoir 27 is filled with liquid 4 as are the tubing or hoses 28 and 29 and the rubber pressure vessel 1. The hoses 28 and 29 connect the reservoir 27 hydraulically to the hollow cavity 2 of the rubber pressure vessel.

The pressurizing reservoir 27 is made of a strong tear resistant material such as steel with high modulus of elasticity and small elongation. It will then deform under impact but not rupture nor stretch appreciably under pressure. The force F of the collision impact at area 21 on the reservoir 27 will crush a portion of the reservoir 27 pressurizing the contained liquid 4. This pressure surge is transmitted through the tubing or hoses 28 and 29 to the rubber pressure vessel 1.

The liquid displaced by the deformed reservoir 27 is forced by pressure differential through tubing or hoses 28 and 29 into the rubber pressure vessel 1 stretching the walls 3 and enlarging the cavity 2 as shown.

The initial volume of the pressurization reservoir 27 should be at least X times as great as the calculated increase in volume of the cavity of the rubber pressure vessel when fully extended after occurrence of the most severe contemplated impact.

Here X represents the ratio of uncrushed length of the reservoir to the crushed length.

A physically large reservoir 27 is undesirable because of the size and weight penalty associated therewith. To minimize reservoir requirements, however, it is necessary that the cavity diameter be minimized. For example, for a truck bumper application where both rubber vessel and reservoir were of equal length an initial (before impact) cavity diameter of one-half inch and a reservoir diameter of 2-½ inches was selected.

Here again the rubber vessel 1 may be designed to provide for pressure loadings due to repeated impacts (on the reservoir 27) of moderate severity in which case the stress levels are low. Or it may be designed for a high energy impact which will stress the rubber vessel 1 to the rupture point. The greater the vessel wall thickness $t$, and the greater the length $l$, the greater will be the energy absorbing capacity.

Some energy is absorbed in accelerating the liquid, and in flow friction. Some is absorbed in stretching the connecting hoses 28 and 29 and stretching the reservoir 27. Most of the energy, however, is absorbed in deformation of the rubber pressure vessel 1.

For automotive applications the reservoir can be mounted horizontally at front and rear of the car or truck 26 in place of the steel bumpers currently in use.

The rubber pressure vessel 1 can be mounted horizontally directly behind the reservoir 27 and affixed thereto. In the event liquid 4 is lost from the reservoir 27 rubber vessel 1 system, the rubber mass would then be in position to absorb some of the energy of the impact.

Figure 9:
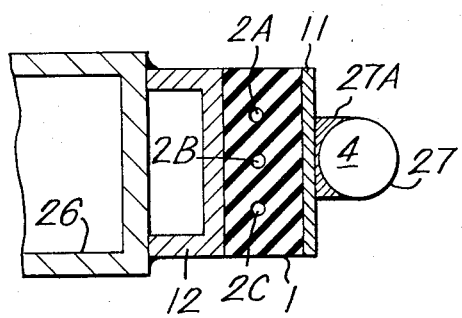
FIG. 9 is a side elevation showing how the pressurization reservoir might be mounted with a rubber pressure vessel at the front and rear of a vehicle in place of conventional steep bumper.

The side view of such a mounting is depicted in FIG. 9. The relative position of the liquid filled reservoir 27 and its liquid filled cavity 4 and its back up support 11, rubber vessel 1, mounting bracket 12 and vehicle chassis 26 are shown. Liquid conduit means between reservoir and rubber vessel cavities 2A, 2B and 2C are omitted for the sake of clarity. Mechanical fasteners also have been omitted except for 27A which is a steel clamp fastening the reservoir 27 to backup support 11.

Figure 10:
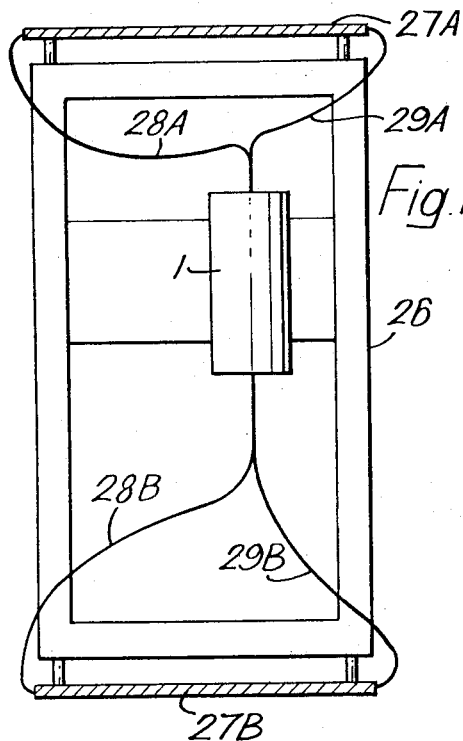
FIG. 10 is plan view of an automobile showing reservoirs mounted at front and rear of the chassis in place of conventional bumpers with the energy absorbing rubber pressure vessel mounted near the middle of the chassis.

Another arrangement is also possible as shown in FIG. 10. Here, the reservoir is mounted at 31 and 32 in place of conventional front and rear bumpers. The rubber pressure vessel 1 however is mounted under the chassis connected to the reservoirs by tubing 28 and 29.

Two reservoirs 27A and 27B are shown connected to the same rubber vessel by tubes 28A, 28B, 29A and 29B. This makes for less weight, and less cost.

Figure 11:
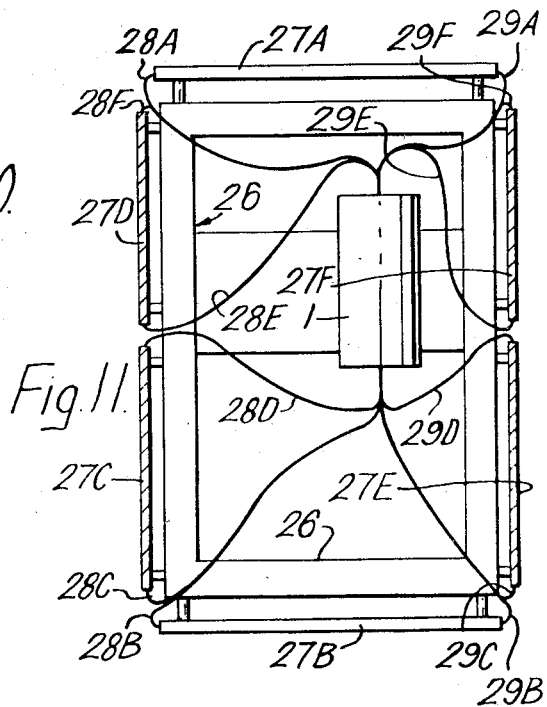
FIG. 11 is a plan view of an automobile showing reservoirs mounted at front rear and sides of a vehicle with energy absorbing pressure vessel mounted near the middle of the chassis.

FIG. 11 depicts an automobile having liquid filled reservoir tubes at front, rear, and sides 27A through 27F all connecting by hoses 28A through F and 29A through F to a central liquid filled rubber pressure vessel 1. Such a system would afford protection from collison impact coming from front, rear or sides.

THIRD EMBODIMENT RUBBER VESSELS WITH BUILT UP WALL

In a thick-wall pressure vessel, there is a considerable variation in stress from the inner surface to the outer. In the case of a vessel subjected to internal pressure, the stress at the inner surface exceeds that of the outer surface by the value of the internal pressure $p$. This means that the rubber near the outside of the rubber cylinder is not absorbing its full share of strain energy.

Figure 12:
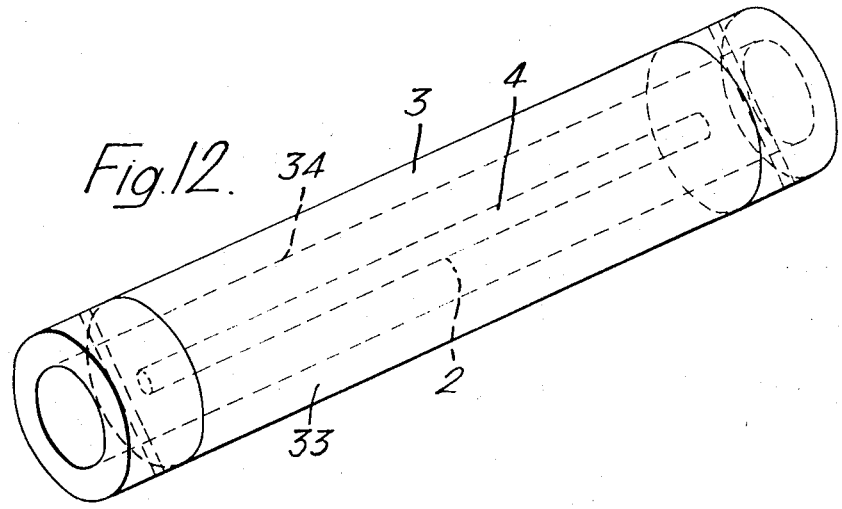
FIG. 12 is a simplified isometric view of a modification of the invention.
Figure 13:
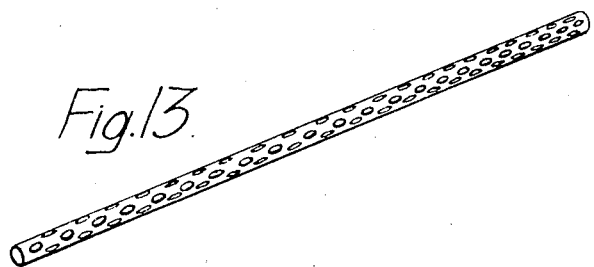
FIG. 13 is an enlarged view of 2 as shown in FIG. 12.

Now refer to FIG. 12. A more favorable initial stress pattern can be created by shrinking on the rubber cylinder 3 an outer cylindrical liner 33 so that a contact pressure is produced at the faying surface 34 between the two. This puts the inner cylinder 3 in compression while in the undisturbed pre-collision condition. The outer cylinder 33 is always in tension. The inside diameter $d_i$ of the outer cylinder 33 when unstressed is smaller than the outer diameter of the unstressed inner cylinder 3. The outer cylinder 11 is stretched by an appropriate mechanical device and slipped over the outside of the inner cylinder 3. Inner and outer cylinders can be made of same or different elastomers. FIG. 13 shows reinforcing rings, 5A, 6A inner cylinder 3 and outer cylinder 33 after assembly.

When collision occurs the built-up cylinder is subjected to an internal pressure. The high resulting stresses near the inner surface 34 are partially offset and diminished by the shrink fit stresses. On the other hand, the stresses at the outer surface of the outer cylinder 33 is higher than for a solid wall cylinder, thus a more nearly uniform stress pattern is obtained. This means the rubber vessel's absorption and energy storage properites are more uniformly and more fully utilized.

The method for calculating stresses in a vessel having a multiple layer wall is described in pages 46–58 of the book, *Pressure Vessel Design Nuclear and Chemical Applications* by John F. Harvey 1963, published by D. Van Nostrand. There, however, the outer vessel, presumably made of steel, is expanded by means of heat so that it can be slipped over the inner vessel. Cooling then establishes the desired contact pressure.

An unusually high dimensional interference must be provided in a built-up rubber vessel to allow for rubber's stress relaxation and creep properties as well as its high elongation. To insure against collapse of the inner cavity 2 in the rubber vessel because of excessive initial shrinkage stress created by the outer liner 33, a perforated rigid metal cylinder 35 can be inserted in the cavity 2. See FIG. 13. The diameter of this perforated metal cylinder 35 should be very slightly smaller than that of the cavity 2 after the outer liner 33 is shrunk over the inner rubber cylinder 3. The length of the perforated metal cylinder should be the same as the length of the cavity 1.

The built-up vessel may be used with or without a pressurization reservoir.

FOURTH EMBODIMENT VESSEL SUBJECTED TO EXTERNAL PRESSURE

Figure 14:
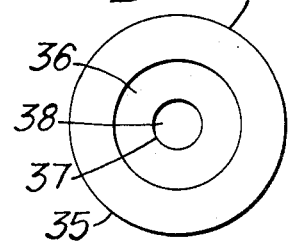
FIG. 14 is an end view of the modification shown in FIG. 12.

In the preceding pages we have discussed an energy absorbing bumper designed as a pressure vessel 1 subjected to internal pressure. It is possible also for an energy absorbing bumper to be designed as a pressure vessel 36 subjected to external pressure. See FIG. 14. The bumper consists of an outer cylindrical pressure vessel of steel 36 or other tough, strong material having high modulus of elasticity. This outer vessel is filled with liquid at atmospheric pressure 4. Also, inside the steel outer shell is a smaller thick-walled pressure vessel made of rubber 36. This vessel 36 may be mounted concentrically or located off-center. The hollow cavity 37 of the rubber vessel 36 is filled with air or an inert gas like nitrogen, or with a vacuum, the latter being preferable. Vacuum can be created during the manufacturing process by filling the hollow core with steam or other condensible gas before closing. Upon cooling and condensation of the steam, a vacuum will result.

In the event of a collision, the outer steel pressure vessel 35 will be crushed raising the pressure of the contained liquid 4. This increase in pressure will result only in a slight stretching of the outer vessel 35 because of its high modulus of elasticity. The rubber vessel will, however, undergo a large deformation. Its outside diameter $d_e$ will be decreased. The diameter of the cavity $d_c$ will likewise be reduced and the volume formerly occupied by vacuum or air will now be occupied by rubber.

The required initial diameter of the rubber vessel's hollow core $d_c$ is dependent upon the amount of energy to be absorbed and the stress-strain characteristics of rubber. It must be large enough to accommodate the rubber forced into the core space as a result of the pressure exerted on the outside of the rubber vessel 36 by the pressurized liquid 4.

The externally pressurized rubber vessel has two advantages over the internally pressurized concept.

The energy absorption (ft. lbs/lb.) of rubber in compression may be greater than that of rubber in tension. Secondly, the interconnecting hoses or piping 38, 39 of FIG. 8 between the liquid reservoir 27 and the rubber pressure vessel 1 are eliminated and thus the danger of loss of liquid due to tear or leak is minimized.

On the other hand, externally pressurized vessel assembly including outer steel vessel 35 will probably have to be more bulky to accommodate the empty cavity 37 of the rubber vessel 36 and the surrounding liquid 4.

In a vessel under internal pressure 1, the stress in the wall is greatest at the interior and diminishes toward the exterior — the region most likely to be subjected to tears and puncture. From this viewpoint then, the internally pressurized design is favored.

Liquid

In all embodiments of this invention the liquid filling the rubber pressure vessel (and the crushable reservoir, if any) should have these properties:

1. Its freezing point must be below the lowest which will be encountered.
2. Its specific gravity should preferably be low.
3. It must not chemically react with the material used to fabricate the pressurized vessel and crushable reservoir or interconnecting piping, if any.

One suitable liquid is ethylene glycol.

A jel may also be used.

If for any reason it is necessary to employ an elastomer which is incompatible with the selected liquid it will be necessary to protect the cavity with a protective liner or coating.

While some preferred embodiments and application of the basic invention have been given for the purpose of disclosure, numerous other embodiments and applications and changes in detail of design, shape, size, arrangement, construction, and combination may be resorted to without departing from the spirit and scope of the invention as hereinafter claimed. In particular the term rubber is used herein in the broadest possible sense to designate any elastomer whatsoever.

I claim:
1. A shock absorber comprising:
   a. a mass of deformable material forming a wall for at least one inner cavity traversing said material mass, said cavity containing liquid which is pressurized by impact upon said mass; and
   b. an inner elastomeric pressure vessel within said liquid having an internal cavity filled with gas at atmospheric pressure or below, said mass and inner vessel cooperating so that impact pressurizes the liquid, which in turn compresses the inner elastomeric pressure vessel and energy is absorbed in its deformation.
2. A shock absorber comprising:
   a. a mass of deformable material forming a wall for at least one inner cavity traversing said material mass, said cavity containing liquid which is pressurized by impact upon said mass; and
   b. wherein the mass of deformable material is in the form of a cylindrical pressure vessel consisting of an outer cylinder enveloping an inner cylinder of greater unstressed diameter so that the inner cylinder is in compression and the outer cylinder is in tension until impact against said mass pressurizes the inner cylinder containing fluid, and the compressive stresses are balanced, both cylinders expand, thereby absorbing energy.

* * * * *